United States Patent
Gerber et al.

(10) Patent No.: US 11,795,354 B2
(45) Date of Patent: *Oct. 24, 2023

(54) EPOXY RESIN ADHESIVE WITH HIGH COMPRESSIVE STRENGTH

(71) Applicant: SIKA TECHNOLOGY AG, Baar (CH)

(72) Inventors: Ulrich Gerber, Uitikon-Waldegg (CH); Steffen Kelch, Oberengstringen (CH); Christoph Mayer, Feusisberg (CH)

(73) Assignee: SIKA TECHNOLOGY AG, Baar (CH)

( * ) Notice: Subject to any disclaimer, the term of this patent is extended or adjusted under 35 U.S.C. 154(b) by 782 days.

This patent is subject to a terminal disclaimer.

(21) Appl. No.: 16/469,825

(22) PCT Filed: Dec. 7, 2017

(86) PCT No.: PCT/EP2017/081906
§ 371 (c)(1),
(2) Date: Jun. 14, 2019

(87) PCT Pub. No.: WO2018/108707
PCT Pub. Date: Jun. 21, 2018

(65) Prior Publication Data
US 2020/0087552 A1    Mar. 19, 2020

(30) Foreign Application Priority Data
Dec. 14, 2016  (EP) .................... 16204079

(51) Int. Cl.
| | | |
|---|---|---|
| C09J 163/00 | (2006.01) |
| C08G 59/22 | (2006.01) |
| C08G 59/24 | (2006.01) |
| C08G 59/50 | (2006.01) |
| C08G 59/56 | (2006.01) |
| C08G 59/64 | (2006.01) |
| C08K 3/36 | (2006.01) |
| C09J 5/00 | (2006.01) |
| C09J 11/04 | (2006.01) |

(52) U.S. Cl.
CPC .......... *C09J 163/00* (2013.01); *C08G 59/226* (2013.01); *C08G 59/245* (2013.01); *C08G 59/50* (2013.01); *C08G 59/502* (2013.01); *C08G 59/504* (2013.01); *C08G 59/5033* (2013.01); *C08G 59/56* (2013.01); *C08G 59/64* (2013.01); *C08K 3/36* (2013.01); *C09J 5/00* (2013.01); *C09J 11/04* (2013.01); *C09J 2463/00* (2013.01)

(58) Field of Classification Search
None
See application file for complete search history.

(56) References Cited

U.S. PATENT DOCUMENTS

| | | | |
|---|---|---|---|
| 3,639,344 A | 2/1972 | Kinnneman, Jr. | |
| 3,769,250 A | 10/1973 | Nikies, Jr. | |
| 4,539,347 A * | 9/1985 | DeGooyer | C08G 59/184 525/484 |
| 6,068,885 A | 5/2000 | Hartman et al. | |
| 6,232,426 B1 * | 5/2001 | Orikabe | C08G 59/686 528/94 |
| 2003/0145949 A1 * | 8/2003 | Tanaka | C09J 7/22 156/330 |
| 2013/0098676 A1 * | 4/2013 | Pauze | C08K 5/17 523/400 |
| 2014/0275446 A1 * | 9/2014 | Kramer | C08G 59/182 564/384 |
| 2015/0174533 A1 * | 6/2015 | Li | B01D 63/02 96/10 |
| 2016/0024295 A1 * | 1/2016 | Karunakaran | C08G 59/5026 525/390 |
| 2016/0160080 A1 * | 6/2016 | Cai | B32B 27/00 523/400 |
| 2018/0044478 A1 * | 2/2018 | Iwaya | C08G 75/04 |
| 2018/0051127 A1 * | 2/2018 | Arai | C08G 59/686 |
| 2019/0010370 A1 * | 1/2019 | Lin | C09J 163/04 |

(Continued)

FOREIGN PATENT DOCUMENTS

| | | |
|---|---|---|
| EP | 1 980 542 A2 | 10/2008 |
| WO | 2014/186031 A1 | 11/2014 |

OTHER PUBLICATIONS

Jun. 18, 2019 International Preliminary Report on Patentability issued in International Patent Application No. PCT/EP2017/081906.

(Continued)

*Primary Examiner* — Megan McCulley
(74) *Attorney, Agent, or Firm* — Oliff PLC

(57) ABSTRACT

An epoxy resin adhesive including at least one epoxy resin in the resin component, at least one adduct AD including primary amino groups which is free-flowing at room temperature and is formed from (i) at least one polyepoxide and (ii) at least one amine of the formula (I) and optionally further amines, and additionally at least one accelerator B having at least one dimethylamino group in the hardener component, and a total of at least 50% by weight of at least one inorganic filler. The epoxy resin adhesive has low odor and good processibility, rapidly builds up strength at room temperature and under cold conditions and, after curing, has high strengths, especially particularly high compressive strengths, and high bonding forces to substrates such as steel, carbon fiber composites (CRP) and concrete.

15 Claims, No Drawings

(56) References Cited

U.S. PATENT DOCUMENTS

2020/0123375 A1* 4/2020 Iwaya ..................... C09K 3/10

OTHER PUBLICATIONS

Ariffin et al., "Strength properties and molecular composition of epoxy-modified mortars," Construction and Building Materials, 2015, vol. 94, pp. 315-322.
Feb. 8, 2018 International Search Report issued in International Patent Application No. PCT/EP2017/081906.

* cited by examiner

EPOXY RESIN ADHESIVE WITH HIGH COMPRESSIVE STRENGTH

TECHNICAL FIELD

The invention relates to the field of low temperature curing epoxy resin adhesives.

PRIOR ART

Room temperature curable epoxy resin adhesives are used for many applications. They typically have high stabilities, high strengths and strong adhesion to different substrates. For applications in the construction industry, they have to be usable under construction site conditions; important features for this purpose are especially easy processibility with not too high a viscosity, and reliable and rapid curing at ambient outdoor temperatures, especially also under cold conditions and at high humidity or under wet conditions. Epoxy resin adhesives having a high content of inorganic fillers, especially quartz flour and/or quartz sand, are also referred to as adhesive mortars. For certain applications, such adhesives should have high compressive strength after curing. Particularly adhesives for the bonding of concrete elements together to form high vertical constructions, for example columns or pillars of high-rise buildings, bridges or towers of wind turbines, must have high compressive strength since the lower adhesive-bonded joins are subject to the high weight of the concrete elements above. Nowadays, energy-efficient wind turbines require ever higher constructions. Elements made of high-strength concrete are used here, which means that there is a demand for adhesives having correspondingly very high compressive strength.

U.S. Pat. No. 6,068,885 describes a low-viscosity, self-leveling epoxy resin composition for repairing cracks in concrete, which achieves a maximum compressive strength in the examples of 15'850 psi (about 109 MPa).

SUMMARY OF THE INVENTION

It is an object of the invention to provide an epoxy resin adhesive which is usable under construction site conditions, has particularly high compressive strength and is suitable for use as adhesive mortar.

This object is surprisingly achieved by an adhesive as described in claim 1. The adhesive comprises inorganic fillers and, in the hardener component, at least one adduct of (i) at least one polyepoxide and (ii) at least one amine of the formula (I), and at least one accelerator B having at least one dimethylamino group. The hardener component is easily preparable and has low odor and low viscosity.

The epoxy resin adhesive of the invention has low odor, is easily producible, and has good processibility even without thinner and low emissions. It builds up strength very quickly at room temperature and under cold conditions and, after curing, has high strengths, a high glass transition temperature and high bonding forces to substrates such as concrete, steel or carbon fiber composites. At the same time, it surprisingly has very high compressive strength well above the values customary for similar epoxy resin adhesives. The epoxy resin adhesive of the invention is usable even under cold and moist conditions, with reliable curing and buildup of good adhesion even on moist substrates, especially moist concrete. It is particularly suitable as adhesive mortar for tower or pipe constructions made of concrete elements bonded one on top of another or one alongside another, as occur in the construction of wind turbines, shaft systems, pipelines or tunnel tubes.

Further aspects of the invention are the subject of further independent claims. Particularly preferred embodiments of the invention are the subject of the dependent claims.

WAYS OF EXECUTING THE INVENTION

The invention provides an epoxy resin adhesive comprising
 a resin component comprising at least one epoxy resin,
 a hardener component comprising
  (a) at least one adduct AD obtained from the reaction of
   (i) at least one polyepoxide with (ii) at least one amine of the formula (I) and optionally further amines,

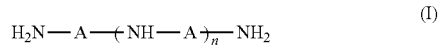

where
  n is an integer from 1 to 10, and
  A in each case is a divalent hydrocarbyl radical having 2 to 8 carbon atoms, where all nitrogen atoms are separated from one another in each case by a chain of at least two carbon atoms, and
  (b) at least one accelerator B having at least one dimethylamino group, wherein the epoxy resin adhesive comprises a total of at least 50% by weight of inorganic fillers.

Substance names beginning with "poly", such as polyamine, polyol or polyepoxide, refer to substances containing, in a formal sense, two or more of the functional groups that occur in their name per molecule.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

An "amine hydrogen" refers to the hydrogen atoms of primary and secondary amino groups.

An "amine hydrogen equivalent weight" refers to the mass of an amine or an amine-containing composition that contains one molar equivalent of amine hydrogen.

A "thinner" refers to a substance which is soluble in an epoxy resin and lowers its viscosity, and which is not covalently incorporated into the resin matrix in the curing of the epoxy resin.

"Viscosity" refers to the dynamic viscosity or shear viscosity which is defined by the ratio between the shear stress and the shear rate (speed gradient) and is determined as described in the working examples.

"Molecular weight" refers to the molar mass (in g/mol) of a molecule. "Average molecular weight" refers to the number average $M_n$ of a polydisperse mixture of oligomeric or polymeric molecules, which is typically determined by means of gel permeation chromatography (GPC) against polystyrene as standard.

"Room temperature" refers to a temperature of 23° C.

Preferably, the epoxy resin adhesive of the invention is not an aqueous system. A nonaqueous epoxy resin adhesive achieves significantly higher curing rates, strengths and compressive strengths, and better adhesion properties.

The epoxy resin adhesive of the invention preferably contains not more than 5% by weight, more preferably not more than 2% by weight, especially not more than 1% by weight, of water.

Both the resin component and the hardener component preferably contain at least one inorganic filler. Such an adhesive is particularly suitable for use as adhesive mortar.

A polyepoxide suitable for conversion to the adduct AD is especially a glycidyl ether having an average functionality based on the glycidoxy groups in the range from 1.8 to 4, especially in the range from 2 to 4.

Especially suitable are industrial, commercially available epoxy resins.

The polyepoxide is preferably a monocyclic or polycyclic aromatic glycidyl ether having an average functionality in the range from 2 to 4.

More particularly, the polyepoxide is an industrial epoxy resin, especially a glycidylization product of:

bisphenol A, bisphenol F or bisphenol A/F, where A stands for acetone and F for formaldehyde, which served as reactants for preparation of these bisphenols. In the case of bisphenol F, positional isomers may also be present, especially derived from 2,4'- or 2,2'-hydroxyphenylmethane.

dihydroxybenzene derivatives such as resorcinol, hydroquinone or catechol;

further bisphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), bis(2-hydroxynaphth-1-yl)methane, bis(4-hydroxynaphth-1-yl)methane or 1,5-dihydroxynaphthalene; or novolaks, which are especially condensation products of phenol or cresols with formaldehyde or paraformaldehyde or acetaldehyde or crotonaldehyde or isobutyraldehyde or 2-ethylhexanal or benzaldehyde or furfural.

Among these, preference is given to bisphenol A diglycidyl ether, bisphenol F diglycidyl ether, bisphenol A/F diglycidyl ether, resorcinol diglycidyl ether or hydroquinone diglycidyl ether, or novolak glycidyl ethers, especially commercially available technical grade qualities thereof.

Such polyepoxides enable high strengths, especially also high compressive strengths, and good adhesion properties.

Particular preference is given to bisphenol A diglycidyl ether, bisphenol F diglycidyl ether or bisphenol A/F diglycidyl ether, especially Araldite® GY 240, Araldite® GY 250, Araldite® GY 281, Araldite® GY 282, Araldite® GY 285, Araldite® PY 304 or Araldite® PY 720 (all from Huntsman), or D.E.R.® 330, D.E.R.® 331, D.E.R.® 332, D.E.R.® 336, D.E.R.® 351, D.E.R.® 352, D.E.R.® or D.E.R.® 356 (all from Olin), or novolak glycidyl ethers.

Most preferably, the polyepoxide is a novolak glycidyl ether having an average functionality in the range from 2.5 to 3.9. This achieves a particularly rapid curing, especially also at temperatures below 10° C., high compressive strengths and high glass transition temperatures.

A suitable novolak glycidyl ether is derived from novolaks that are condensation products of phenol or cresols with formaldehyde or paraformaldehyde or acetaldehyde or crotonaldehyde or isobutyraldehyde or 2-ethylhexanal or benzaldehyde or furfural. Such a novolak glycidyl ether is typically liquid at room temperature, or very highly viscous up to barely free-flowing, or solid.

Preference is given to a novolak glycidyl ether derived from phenol-formaldehyde novolaks, which are also referred to as epoxy-phenol novolak resins.

Such novolak glycidyl ethers are commercially available, for example from Olin, Huntsman, Momentive or Emerald Performance Materials. Preferred products are D.E.N.® 431, D.E.N.® 438 or D.E.N.® 439 (from Olin), Araldite® EPN 1179, Araldite® EPN 1180, Araldite® EPN 1182 or Araldite® EPN 1183 (from Huntsman), Epon® 154, Epon® 160 or Epon® 161 (from Momentive) or Epalloy® 8250, Epalloy® 8330 or Epalloy® 8350 (from Emerald Performance Materials).

For the reaction to give the adduct AD, at least one amine of the formula (I) and optionally further amines are used.

Preferably, n is an integer from 1 to 7, especially 1 to 6.

Preferably, A has 2 to 6 carbon atoms.

Preferably, A is 1,2-ethylene, 1,3-propylene, 1,4-butylene, 1,3-pentylene, 2-methyl-1,5-pentylene or 1,6-hexylene.

More preferably, A is selected from the group consisting of 1,2-ethylene, 1,3-propylene and 1,6-hexylene.

If A is 1,6-hexylene, n is preferably 1.

A preferred amine of the formula (I) is diethylenetriamine (DETA), triethylenetetramine (TETA), tetraethylenepentamine (TEPA), pentaethylenehexamine (PEHA), hexaethyleneheptamine (HEHA), heptaethyleneoctamine (HEOA), dipropylenetriamine (DPTA), N-(2-aminoethyl)propane-1,3-diamine (N3 amine), N,N'-bis(3-aminopropyl)ethylenediamine (N4 amine), bis(6-aminohexyl)amine (=bis(hexamethylene)triamine or BHMT), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine or N,N'-bis(3-amino-1-ethylpropyl)-2-methylpentane-1,5-diamine.

The amine of the formula (I) is more preferably selected from the group consisting of TETA, TEPA, PEHA, HEHA, N4 amine and BHMT. These amines enable particularly high strengths, especially particularly high compressive strengths.

Among these, preference is given to TETA, TEPA, PEHA and/or HEHA. These achieve particularly high glass transition temperatures, and TETA has the advantage that low-viscosity adducts AD containing a particularly high content of structural units deriving from polyepoxide are obtainable, which is advantageous in relation to rapid curing, especially also at temperatures below 10° C., while TEPA, PEHA and/or HEHA enable particularly low-odor adhesives. Further preferred among these is N4 amine. This achieves particularly high compressive strengths.

Further preferred among these is BHMT. BHMT enables adhesives that are particularly extensible and have a particularly low propensity to curing defects under cold conditions, and hardener components having a relatively high amine hydrogen equivalent weight, which is advantageous for the formulating of adhesive mortars with a high filler content.

The amine of the formula (I) is optionally used together with further amines. The content of the amine of the formula (I) is preferably at least 50% by weight here, more preferably at least 60% by weight, based on the sum total of the amines used.

Preference is given to using the amine of the formula (I) in a technical grade quality. This is typically a mixture of amines which, as well as amines of the formula (I), additionally contains one or more further amines that do not conform to the formula (I). Such a technical grade quality typically results from the preparation process for the amine of the formula (I), where the content of amine of the formula (I) can be different according to the mode of preparation and purification process.

Preferably, the amine of the formula (I) is used together with at least one further amine that does not conform to the formula (I) and is a constituent of a technical grade quality of the amine of the formula (I), where the content of amine of the formula (I) in such a technical grade quality is preferably at least 50% by weight, more preferably at least 60% by weight.

The amine of the formula (I) may also take the form of a mixture comprising multiple different amines of the formula (I). Especially in the case that A=1,2-ethylene, the amine of the formula (I) may take the form of a mixture of multiple amines having different values of n.

More particularly, it is also possible to use a mixture of amines of the formula (I) with different meanings of A and n, especially a mixture of BHMT and TETA and/or TEPA.

The use of a technical grade quality of the amine of the formula (I) for the preparation of the adduct AD enables inexpensive epoxy resin adhesives having particularly high compressive strengths.

In the case of TETA as amine of the formula (I), a technical grade quality typically contains N,N,N-tris(2-aminoethyl)amine, N,N'-bis(2-aminoethyl)piperazine and/or N-(5-amino-3-azapentyl)piperazine.

In the case of TEPA as amine of the formula (I), a technical grade quality typically contains N,N-bis(2-aminoethyl)-N-(5-amino-3-azapentyl)amine, N-(2-aminoethyl)-N'-(5-amino-3-azapentyl)piperazine and/or N-(8-amino-3,6-diazaoctyl)piperazine.

In the case of BHMT as amine of the formula (I), a technical grade quality typically contains higher oligomers of BHMT, hexamethylene-1,6-diamine, 6-aminocapronitrile and/or 6-aminocaproamide.

"Higher oligomers of hexamethylene-1,6-diamine" refer here to oligomers having three or more hexamethylene-1,6-diamine units.

Preferably, in the reaction to give the adduct AD, aside from
  amines of the formula (I) and
  further amines present in a technical grade quality of the amines of the formula (I) used,
no further amines are present.

The adduct AD is especially obtained from the reaction of the polyepoxide with a stoichiometric excess of the amine of the formula (I) and optionally further amines.

In particular, the primary amino groups of the amine of the formula (I) and any further amines present are in a stoichiometric excess over the epoxy groups of the polyepoxide in the reaction to give the adduct.

In the reaction to give the adduct, the ratio between the number of primary amino groups present and the number of epoxy groups present is preferably at least 3, especially at least 4.

Preferably, the ratio between the number of primary amino groups present and the number of epoxy groups present in the reaction to give the adduct is in the range from 3 to 12, more preferably 4 to 8, especially 4 to 6. In this way, an adduct having manageable viscosity which is free-flowing at room temperature is obtained, which has primary and secondary amino groups and a high content of structural units originating from the polyepoxide.

After the preparation, unconverted amine can be partly removed, especially by means of distillation. Preference is given to not removing unconverted amine from the adduct.

Preferably, the adduct AD has a viscosity at 25° C. of less than 100 Pa·s, more preferably less than 50 Pa-s, especially less than 30 Pa-s.

Preferably, the temperature in the reaction to give the adduct is in the range from 40 to 140° C., especially 50 to 120° C. The temperature is suitably kept within the range specified until the epoxy groups have been converted for the most part.

The reaction can optionally be effected in the presence of a thinner, where thinners also refer to what are called solvents. The reaction is preferably effected without the use of a thinner. In this way, hardener components free of thinners are obtainable in a simple manner.

The resultant adduct AD is typically a mixture comprising
  simple adducts in which each structural unit derived from amines of the formula (I) and optionally further amines is in each case only in singly alkylated or adducted form,
  higher adducts in which at least one structural unit derived from amines of the formula (I) and optionally further amines is in at least doubly alkylated or adducted form, and
  free amine of the formula (I) and optionally further free amines.

A typical simple adduct having a structural unit derived from a polyepoxide having x glycidoxy groups and structural units derived from amines of the formula (I) has the following formula:

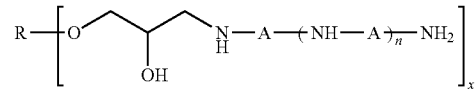

where
x is an integer from 2 to 4,
R is the residue of a polyepoxide after removal of x glycidoxy groups, and n and A have the definitions already given.

The hardener component additionally comprises at least one accelerator B having at least one dimethylamino group.

Suitable accelerators B are especially benzyldimethylamine, α-methylbenzyldimethylamine, N,N-diethyl-N',N'-dimethylpropane-1,3-diamine, N,N-dimethylethanolamine, 3-(N,N-dimethylamino)propan-1-ol, 2- or 4-(dimethylaminomethyl)phenol, 2,4- or 2,6-bis(N,N-dimethylaminomethyl)phenol, 2,4,6-tris(N,N-dimethylaminomethyl)phenol, 2,4,6-tris(N,N-dimethyl-4-amino-2-azabutyl)phenol or the accelerators of the formula (II) described below.

A particularly preferred accelerator B is an accelerator B of the formula (II)

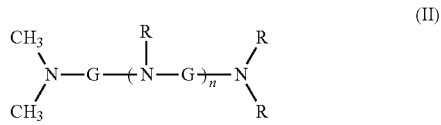

where
m is 0 or 1 or 2 or 3 or 4,
G in each case is a divalent hydrocarbyl radical having 2 to 8 carbon atoms, where all nitrogen atoms are separated from one another in each case by a chain of at least two carbon atoms, and
R in each case is a hydrogen radical or is a methyl radical.

An accelerator B of the formula (II) enables epoxy resin adhesives having good processability that are particularly insensitive to curing defects under cold conditions.

Preferably, m is 0 or 1 or 2, especially 1. Such an accelerator enables efficiently processible epoxy resin adhesives having particularly low odor.

Preferably, G has 2 to 6 carbon atoms.

Preferably, G is 1,2-ethylene, 1,3-propylene, 1,4-butylene, 1,3-pentylene, 2-methyl-1,5-pentylene or 1,6-hexylene.

More preferably, G is 1,2-ethylene, 1,3-propylene or 1,6-hexylene, especially 1,3-propylene.

Preferably, at least one R radical is a hydrogen radical. Such an accelerator is incorporated into the polymer network in the course of curing, which prevents migration out of the cured adhesive and hence is advantageous from an environmental and toxicological point of view.

More preferably, all R radicals are a hydrogen radical. Such an accelerator enables particularly efficiently processible epoxy resin adhesives having high extensibility.

Most preferably, m is 1, G is 1,3-propylene and each R is a hydrogen radical. This accelerator is incorporated rapidly and completely into the cured epoxy resin polymer on curing and enables very low-odor adhesives having particularly good processability, very high compressive strength, barely any curing defects under cold conditions and very high tensile bond strength between concrete and steel.

Suitable accelerators B of the formula (II) are especially N,N,N',N'-tetramethylethane-1,2-diamine, N,N,N',N'-tetramethylpropane-1,3-diamine, N,N,N',N'-tetramethylbutane-1,4-diam ine, N,N,N',N'-tetramethylhexane-1,6-diamine, N,N,N',N',N''-pentamethyldiethylenetriamine, N,N,N',N', N''-pentamethyldipropylenetriamine, N,N,N',N',N''-pentamethyl-N-(2-aminoethyl)propane-1,3-diamine, N,N-dimethylethane-1,2-diamine, N,N-dimethylpropane-1,3-diamine, N,N-dimethylbutane-1,4-diamine, N,N-dimethylhexane-1,6-diamine, 2-(2-(dimethylamino)ethylamino)ethylamine, 2-(3-(dimethylamino)propylamino)ethylamine, 3-(2-(dimethylamino)ethylamino)propylamine, 3-(3-(dimethylamino)propylamino)propylamine (DMAPAPA), bis(2-(N,N-dimethylamino)ethyl)amine or bis(3-(N,N-dimethylamino)propyl)amine. Particular preference is given to N,N,N',N',N''-pentamethyldiethylenetriamine, 3-(3-(dimethylamino)propylamino)propylamine (DMAPAPA) or bis(3-(N,N-dimethylamino)propyl)amine. These accelerators are readily available, have low odor and enable high compressive strengths, high bond strengths and barely any curing defects under cold conditions.

The most preferred accelerator B is 3-(3-(dimethylamino)propylamino)propylamine (DMAPAPA). DMAPAPA has low odor, is of no toxicological concern, is readily commercially available and thins the adduct AD particularly efficiently. It is incorporated rapidly and completely into the cured epoxy resin polymer on curing and enables very low-odor adhesives having particularly good processability, very high compressive strength, barely any curing defects under cold conditions and very high tensile bond strength between concrete and steel.

Preferably, the accelerator B is not present in the preparation of the adduct AD.

The hardener component may contain further polyamines in addition to the adduct AD and to the accelerator B. Suitable further polyamines are polyamines having an average of at least two, especially at least three, amine hydrogens reactive toward epoxy groups per molecule, especially the following amines:

aliphatic, cycloaliphatic or arylaliphatic primary diamines, especially pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, DETA, TETA, TEPA, PEHA, HEHA, DPTA, N3 amine, N4 amine, N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine or N,N'-bis(3-amino-1-ethylpropyl)-2-methylpentane-1,5-diamine, bis(6-aminohexyl)amine (BHMT), 1,2-, 1,3- or 1,4-diaminocyclohexane, bis(4-aminocyclohexyl)methane ($H_{12}$-MDA), bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.0$^{28}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA), 1,4-bis(aminomethyl)benzene, 2,5-bis(aminomethyl)furan or 2,5-bis(aminomethyl)tetrahydrofuran;

aliphatic, cycloaliphatic or arylaliphatic primary triamines, especially 4-aminomethyloctane-1,8-diamine, 1,3,5-tris(aminomethyl)benzene, 1,3,5-tris(aminomethyl)cyclohexane, tris(2-aminoethyl)amine, tris(2-aminopropyl)amine, tris(3-aminopropyl)amine or N,N-bis(2-aminoethyl)-N-(5-amino-3-azapentyl)amine;

aliphatic primary di- or triamines containing ether groups, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, diamines containing cycloaliphatic ether groups from the propoxylation and subsequent amination of 1,4-dimethylolcyclohexane, especially obtainable as Jeffamine® RFD-270 (from Huntsman), or polyoxyalkylenedi- or -triamines that are typically products from the amination of polyoxyalkylenedi- or -triols and are obtainable, for example, under the Jeffamine® trade name (from Huntsman), under the Polyetheramine trade name (from BASF) or under the PC Amine trade name (from Nitroil). Especially suitable polyoxyalkylenedi- or -triamines are Jeffamine® D-230, Jeffamine® D-400, Jeffamine® D-205, Jeffamine® EDR-104, Jeffamine® EDR-148, Jeffamine® EDR-176, Jeffamine® T-403, or corresponding amines from BASF or Nitroil;

polyamines having one or two secondary amino groups, especially products from the reductive alkylation of primary aliphatic polyamines with aldehydes or ketones, especially N-benzyl-1,3-bis(aminomethyl)benzene, N,N'-dibenzyl-1,3-bis(aminomethyl)benzene, N-benzylpropane-1,2-diamine, N-benzylethane-1,2-diamine, or partially styrenized polyamines, for example styrenized MXDA (available as Gaskamine 240 from Mitsubishi Gas Chemical);

polyamines with primary aliphatic amino groups that have tertiary amino groups and are free of dimethylamino groups, such as, in particular, N,N-diethyldi(1,3-propylene)triamine (DEAPA), N,N-diethyldi(1,2-ethylene)triamine, 1-(N,N-diethylamino)-4-aminopentane, N-aminoethylpiperazine, N-aminopropylpiperazine, N,N'-bis(aminopropyl)piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine or products from the double cyanoethylation and subsequent reduction of fatty amines derived from natural fatty acids, especially N,N-bis(3-aminopropyl)dodecylamine or N,N-bis(3-aminopropyl)tallowalkylamine, available as Triameen® Y12D or Triameen® YT (from Akzo Nobel).

Preferably, such further polyamines are not part of the adduct AD, meaning that they were not present in the preparation of the adduct AD and do not contain any components adducted to polyepoxide structural units.

A preferred further polyamine is a polyoxyalkylenedi- or -triamine such as, in particular, Jeffamine® D-230, Jeffamine® D-400 or Jeffamine® T-403 (from Huntsman). It is thus possible to increase the extensibility of the adhesive after curing.

In addition, the hardener component may contain further compounds reactive toward epoxides, especially the following:

primary monoamines such as, in particular, hexylamine, benzylamine or furfurylamine;

aromatic polyamines such as, in particular, m- and p-phenylenediamine, 4,4'-, 2,4'- and/or 2,2'-diaminodiphenylmethane, 3,3'-dichloro-4,4'-diaminodiphenylmethane (MOCA), tolylene-2,4- and/or -2,6-diamine, mixtures of 3,5-dimethylthiotolylene-2,4- and -2,6-diamine (available as Ethacure 300 from Albemarle), mixtures of 3,5-diethyltolylene-2,4- and -2,6-diamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzenesulfonamide, 5,5'-methylenedianthranilic acid, dimethyl 5,5'-methylenedianthranilate, propylene 1,3-bis(4-aminobenzoate), butylene 1,4-bis(4-aminobenzoate), polytetramethylene oxide bis(4-aminobenzoate) (available as Versalink® from Air Products), 1,2-bis(2-aminophenylthio)ethane, 2-methylpropyl 4-chloro-3,5-diaminobenzoate or tert-butyl (4-chloro-3,5-diaminobenzoate);

adducts of further polyamines with epoxides or epoxy resins, especially adducts of the aforementioned amines with dipropylene glycol diglycidyl ethers or polypropylene glycol diglycidyl ethers, or adducts of MXDA and/or IPDA with diepoxides, such as, in particular, bisphenol A diglycidyl ethers and/or bisphenol F diglycidyl ethers, or adducts of MPMD or propylene-1,2-diamine with monoepoxides, such as, in particular, cresyl glycidyl ether in a molar ratio of about 1:1, or reaction products of amines and epichlorohydrin, especially that of 1,3-bis(aminomethyl)benzene, commercially available as Gaskamine 328 (from Mitsubishi Gas Chemical);

polyamidoamines, especially reaction products of a mono- or polybasic carboxylic acid, or the esters or anhydrides thereof, especially a dimer fatty acid, with an aliphatic, cycloaliphatic or aromatic polyamine used in a stoichiometric excess, especially a polyalkyleneamine, for example DETA or TETA, especially the commercially available polyamidoamines Versamid® 100, 125, 140 or 150 (from Cognis), Aradur® 223, 250 or 848 (from Huntsman), Euretek® 3607 or 530 (from Huntsman) or Beckopox® EH 651, EH 654, EH 655, EH 661 or EH 663 (from Cytec); or Mannich bases obtained from the reaction of phenols with aldehydes, especially formaldehyde, and aliphatic or cycloaliphatic amines, especially phenalkamines, i.e., Mannich bases of cardanol (long-chain alk(en)ylphenols and -resorcinols obtained by thermal treatment of cashewnutshell oil extracts, containing as main component 3-(pentadeca-8,11,14-trienyl)phenol), more particularly the commercial products Cardolite® NX-5607 or NX-5608 (from Cardolite), or Aradur® 3440, 3441, 3442 or 3460 (from Huntsman), or Beckopox® EH 614, EH 621, EH 624, EH 628 or EH (from Cytec);

liquid mercaptan-terminated polysulfide polymers, known by the Thiokol® trade name (from Morton Thiokol; available, for example, from SPI Supplies, or from Toray Fine Chemicals), especially the LP-3, LP-33, LP-980, LP-23, LP-55, LP-56, LP-12, LP-31, LP-32 or LP-2 products; and also known by the Thioplast brand name (from Akzo Nobel), especially the G 10, G 112, G 131, G 1, G 12, G 21, G 22, G 44 or G 4 products;

mercaptan-terminated polyoxyalkylene derivatives, obtainable, for example, by reaction of polyoxyalkylenedi- or -triols either with epichlorohydrin or with an alkylene oxide, followed by sodium hydrogensulfide, commercially available, for example, as Gabepro® GPM-800 (from Gabriel Performance Products) or under the Capcure® brand name (from Cognis), especially the WR-8, LOF or 3-800 products;

polyesters of thiocarboxylic acids, for example pentaerythritol tetramercaptoacetate, trimethylolpropane trimercaptoacetate, glycol dimercaptoacetate, pentaerythritol tetra(3-mercaptopropionate), trimethylolpropane tri(3-mercaptopropionate) or glycol di(3-mercaptopropionate), or esterification products of polyoxyalkylenediols or -triols, ethoxylated trimethylolpropane or polyester diols with thiocarboxylic acids such as thioglycolic acid or 2- or 3-mercaptopropionic acid; or further compounds having mercapto groups, such as, in particular, 2,4,6-trimercapto-1,3,5-triazine, 2,2'-(ethylenedioxy)diethanethiol (triethylene glycol dimercaptan) or ethanedithiol.

Preferably, the hardener component has a content of adduct AD in the range from 20% to 80% by weight, especially 30% to 80% by weight, based on the compounds reactive with epoxy groups that are present in the hardener component.

Preferably, the hardener component has a content of accelerator B in the range from 5% to 70% by weight, more preferably 10% to 65% by weight, especially 15% to 60% by weight, based on the compounds reactive with epoxy groups that are present in the hardener component.

More preferably, the hardener component has a content of DMAPAPA in the range from 10% to 70% by weight, more preferably 15% to 60% by weight, based on the compounds reactive with epoxy groups that are present in the hardener component. A high content of DMAPAPA enables high compressive strengths, although the glass transition temperatures attained are reduced at contents above about 70% by weight.

A particularly preferred hardener component contains
30% to 80% by weight of adduct AD,
10-15% to 60% by weight of DMAPAPA, and
0% to 40% by weight of further polyamines,
based on the compounds reactive with epoxy groups that are present in the hardener component.

A suitable further polyamine is especially a polyoxyalkylenedi- or -triamine.

The hardener component is preferably largely free of amines having a molecular weight below 120 g/mol. It preferably contains less than 2 weight %, especially less than 1 weight %, of amines having a molecular weight below 120 g/mol. Thus, it has particularly low odor.

The hardener component may contain at least one accelerator. Suitable accelerators are substances which accelerate the reaction between amino groups and epoxy groups, especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids such as, in particular, phosphoric acid, or mixtures of the aforementioned acids and acid esters; tertiary amines such as, in particular, the accelerators B already mentioned, or 1,4-diazabicyclo[2.2.2]octane, triethanolamine, imidazoles such as, in particular, N-methylimidazole, N-vinylimidazole or 1,2-dimethylimidazole, salts of such tertiary amines, quaternary ammonium salts, such as, in particular, benzyltrimethylammonium chloride, amidines such as, in particular, 1,8-diazabicyclo[5.4.0]undec-7-ene, guanidines such as, in particular, 1,1,3,3-tetramethylguanidine, phenols, especially bisphenols, phenolic resins or Mannich bases such as, in particular, 2,4,6-tris(dimethylaminomethyl)phenol or 2,4,6-tris(N,N-dimethyl-4-amino-2-azabutyl)phenol that have already been mentioned as accelerator B, phosphites such as, in particular, di- or triphenyl phosphites, or compounds having mercapto groups. Preferred accelerators are acids, tertiary amines or Mannich bases.

Most preferred is salicylic acid or 2,4,6-tris(dimethylaminomethyl)phenol or 2,4,6-tris(N,N-dimethyl-4-amino-2-azabutyl)phenol or a combination thereof.

Preferably, a hardener component containing DMAPAPA as accelerator B does not contain any further accelerators. Such an adhesive is of low viscosity, enables rapid curing and high strengths, and is of particularly low toxicological concern since DMAPAPA is incorporated into the cured epoxy resin polymer on curing.

The invention further provides a process for preparing the hardener component of the epoxy resin adhesive, comprising the steps of preparing the adduct AD by reacting at least one polyepoxide with at least one amine of the formula (I) and optionally further amines, where the primary amino groups are in a stoichiometric excess over the epoxy groups, at a temperature in the range from 40 to 140° C., especially 50 to 120° C., until all the epoxy groups have reacted, mixing the resultant adduct AD with at least one accelerator B having at least one dimethylamino group, optionally adding at least one inorganic filler and optionally further substances.

In the reaction to give the adduct AD, the ratio between the number of primary amino groups present and the number of epoxy groups present is preferably in the range from 3 to 12, more preferably 4 to 8, especially 4 to 6.

Suitable and preferred polyepoxides, amines of the formula (I), accelerators B and further substances here are those already mentioned as described above. The adduct AD can be mixed with the accelerator B directly after the preparation, or it can be stored in a suitable container for a few days up to several months before it is mixed with the accelerator B and processed to give the hardener component described.

Preferably, the adduct AD, before being mixed with the accelerator B, has a viscosity at 25° C. of less than 100 Pa·s, more preferably less than 50 Pa·s, especially less than 30 Pa·s.

The resin component of the epoxy resin adhesive contains at least one epoxy resin.

Suitable epoxy resins are standard industrial epoxy resins. These are obtained in a known manner, for example from the oxidation of the corresponding olefins or from the reaction of epichlorohydrin with the corresponding polyols, polyphenols or amines.

Particularly suitable epoxy resins are what are called liquid polyepoxide resins, referred to as "liquid resin" hereinafter. These have a solidification temperature below 25° C.

Likewise possible as epoxy resins are what are called solid resins which have a solidification temperature above 25° C. and can be comminuted to powders that are pourable at 25° C.

Suitable epoxy resins are especially aromatic epoxy resins, especially the glycidylization products of:

bisphenol A, bisphenol F or bisphenol A/F, where A stands for acetone and F for formaldehyde, which served as reactants for preparation of these bisphenols. In the case of bisphenol F, positional isomers may also be present, especially derived from 2,4'- or 2,2'-hydroxyphenylmethane.

dihydroxybenzene derivatives such as resorcinol, hydroquinone or catechol;

further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4- bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;

condensation products of phenols with formaldehyde that are obtained under acidic conditions, such as phenol novolaks or cresol novolaks, also called epoxy novolak resins or novolak glycidyl ethers;

aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, especially glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

hydrogenated bisphenol A, F or A/F liquid resins, or glycidylization products of hydrogenated bisphenol A, F or A/F;

N-glycidyl derivatives of amides or heterocyclic nitrogen bases, such as triglycidyl cyanurate or triglycidyl isocyanurate, or reaction products of epichlorohydrin with hydantoin.

epoxy resins from the oxidation of olefins such as, in particular, vinylcylohexene, dicyclopentadiene, cyclohexadiene, cyclododecadiene, cyclododecatriene, isoprene, 1,5-hexadiene, butadiene, polybutadiene or divinylbenzene.

A preferred epoxy resin is a liquid resin based on a bisphenol, especially a diglycidyl ether of bisphenol A, bisphenol F or bisphenol A/F, as commercially available, for example, from Dow, Olin, Huntsman or Momentive. These liquid resins have a low viscosity for epoxy resins and good properties in the cured state as a coating. They may contain proportions of solid bisphenol A resin or novolak glycidyl ethers.

The resin component may comprise a reactive diluent, especially a reactive diluent having at least one epoxy group. Suitable reactive diluents are especially the glycidyl ethers of mono- or polyhydric phenols or aliphatic or cycloaliphatic alcohols, such as, in particular, the polyglycidyl ethers of di- or polyols that have already been mentioned, especially butane-1,4-diol diglycidyl ether, hexane-1,6-diol diglycidyl ether or glycidyl ethers of glycerol, polyglycerol or trimethylolpropane, or phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as, in particular, $C_8$- to $C_{10}$-alkyl glycidyl ethers or $C_{12}$- to $C_{14}$-alkyl glycidyl ethers.

Preferably, the resin component comprises at least one reactive diluent, especially a diglycidyl ether. Such a reactive diluent improves processibility without too severe an impact on strength.

Preferably, the epoxy resin adhesive comprises a total of 50% to 95% by weight, especially 50% to 90% by weight, of inorganic fillers.

In a preferred embodiment of the invention, the resin component contains 50% to 90% by weight of inorganic fillers and the hardener component contains 50% to 95% by weight of inorganic fillers.

In a further embodiment of the invention, the resin component and the hardener component are largely free of inorganic fillers, inorganic fillers being present as a separate filler component.

A suitable inorganic filler is especially ground or precipitated calcium carbonate which has optionally been coated with fatty acid, especially stearates, baryte (heavy spar), talc, quartz flour, quartz sand, silicon carbide, iron mica, dolomite, wollastonite, kaolin, mica (potassium aluminosilicate), molecular sieve, aluminum oxide, aluminum hydroxide, magnesium hydroxide, silica, cement, gypsum, fly ash. Preferred inorganic fillers are silicatic fillers, especially quartz flour, quartz sand, silicon carbide, wollastonite or mica.

More preferably, the epoxy resin adhesive contains quartz flour and/or quartz sand as inorganic filler, especially a combination of quartz flour and quartz sand. Such an adhesive enables particularly high compressive strengths.

Preferably, the epoxy resin adhesive comprises a total of 50% to 90% by weight, especially 60% to 85% by weight, of quartz flour and/or quartz sand. In addition, the adhesive preferably contains at least one further inorganic filler, especially a precipitated, fatty acid-coated calcium carbonate. This can reduce the settling of the quartz filler in the components during the storage time.

The epoxy resin adhesive may comprise additional constituents, where these may be present as a constituent of the resin component or of the hardener component or as a constituent of both components. Constituents reactive toward epoxy groups are preferably part of the hardener component; constituents reactive toward amino groups are preferably part of the resin component.

Preferably, the epoxy resin adhesive contains at least one thixotropic agent. Suitable thixotropic agents are especially fumed silicas. Particularly suitable thixotropic agents are those that build up the thixotropy only by virtue of the mixing of the components ("in situ"). Preferred in situ thixotropic agents are combinations of fumed silicas with glycols and/or polyethyleneimines, where the fumed silica is present in the first component and the glycol or polyethyleneimine in the second component. Preferred fumed silicas are unmodified (hydrophilic) types. Preferred glycols are polyethylene glycols. Preferred polyethyleneimines are polyethyleneimines having an average molecular weight in the range from 800 to 2,000,000, especially 2000 to 750,000, more preferably 5000 to 100,000, g/mol, as commercially available in undiluted form or as an aqueous solution, for example under the Lupasol® brand name (from BASF) or Epomin® (from Nippon Shokubai). Likewise suitable are combinations of fumed silicas with additives such as, in particular, BYK®-R 605, BYK®-R 607 or BYK®-R 608 (all from BYK Additives and Instruments). Particular preference is given to combinations of unmodified fumed silica, especially the Aerosil® 200 (from Evonik Industries), HDK® N20 (from Wacker Chemie), CAB-O-SIL® M-5 (from Cabot) or REOLOSIL® QS-102 (from Akpa Kimya) products, with polyethyleneimines, especially the Lupasol® WF, Lupasol® HF (all from BASF) or Epomin® SP-200 (from Nippon Shokubai) products.

The epoxy resin adhesive may further contain at least one thinner, especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methylpyrrolidone, diphenylmethane, diisopropylnaphthalene, mineral oil fractions, for example Solvesso® products (from Exxon), alkylphenols such as tert-butylphenol, nonylphenol, dodecylphenol or cardanol (from cashewnutshell oil, containing, as main constituent, 3-(8,11,14-pentadecatrienyl)phenol, available, for example, as Cardolite NC-700 from Cardolite Corp., USA), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides.

The adhesive preferably contains only a small content of thinners, if any. It preferably contains not more than 10% by weight, more preferably not more than 5% by weight, especially not more than 2% by weight, of thinner. It is especially free of thinners. Such an epoxy resin adhesive is particularly pressure-resistant and has particularly low emissions.

The adhesive optionally contains further ingredients, especially selected from the following auxiliaries and additives:
  accelerators, especially those already mentioned;
  fibers, especially glass fibers, carbon fibers, metal fibers, ceramic fibers or polymer fibers such as polyamide fibers or polyethylene fibers;
  pigments, especially titanium dioxide, iron oxides or chromium(III) oxide;
  rheology modifiers, especially thickeners or antisettling agents;
  adhesion improvers, especially organoalkoxysilanes;
  stabilizers against oxidation, heat, light or UV radiation;
  flame-retardant substances;
  surface-active substances, especially wetting agents, leveling agents, deaerating agents or defoamers; and
  biocides, for example algicides or fungicides.

In the epoxy resin adhesive, the ratio of the number of amine hydrogens reactive toward epoxy groups relative to the number of epoxy groups is preferably in the range from 0.7 to 1.5, especially 0.8 to 1.2.

The components of the epoxy resin adhesive are stored in separate containers. A suitable container for storage of the resin component or the hardener component is especially a vat, a hobbock, a bag, a bucket, a can, a cartridge or a tube. The components are storable, meaning that they can be stored prior to use for several months up to one year or longer, without any change in their respective properties to a degree of relevance to their use. For use of the epoxy resin adhesive, the resin component and the hardener component and any filler component present are mixed with one another shortly before or during application. The mixing ratio between the components is preferably chosen such that the groups of the hardener component that are reactive toward epoxy groups are in a suitable ratio to the epoxy groups of the resin component, as described above. In parts by weight, the mixing ratio between the resin component and the hardener component is typically in the range from 1:10 to 10:1. especially 10:1 to 1:1.

The components are mixed by means of a suitable method. The mixing can be effected continuously or batchwise. If the mixing precedes the application, it must be ensured that not too much time passes between the mixing of the components and the application, since this can result in defects, for example slowed or incomplete buildup of adhesion. The mixing is especially effected at ambient temperature, which is typically within the range from about 0 to 40° C., preferably about 5 to 30° C.

Curing by chemical reaction begins on mixing of the components. The epoxy groups react with the amino groups bearing amine hydrogen and any further groups reactive toward epoxy groups that are present with ring opening to give amino alcohol units. Further epoxy groups react with one another under anionic polymerization, especially with catalysis by dimethylamino groups. As a result of these reactions, the adhesive cures to give a crosslinked material. It is known to the person skilled in the art that primary amino groups are difunctional with respect to epoxy groups.

The curing is especially effected at ambient temperature. It typically extends over a few hours to days until it is substantially complete under the given conditions. Important influencing parameters here are the temperature, the stoichiometry and the presence of accelerators.

As a result of the curing reaction, a cured adhesive is obtained.

The invention thus further provides a cured adhesive obtained from the epoxy resin adhesive described after the mixing of the components and curing thereof.

Typically, the adhesive has a pasty consistency after the components have been mixed. On application, the freshly mixed adhesive is applied within its open time to at least one of the substrates to be bonded and the two substrates are joined to form an adhesive bond within the open time of the adhesive. "Open time" refers here to the period of time between the mixing of the components and the juncture from which sufficient deformability of the adhesive and/or sufficient buildup of adhesion to the substrates is no longer assured.

The freshly mixed adhesive is applied especially by means of a brush, roll, spatula, doctor blade or trowel, or from a tube, cartridge or metering device.

The epoxy resin adhesive is preferably used at temperatures in the range from to 100° C., preferably 5 to 80° C., especially 10 to 50° C., more preferably at ambient outdoor temperatures, in covered shelters or in buildings, preferably within the range from 0 to 40° C., especially 5 to 30° C.

The epoxy resin adhesive is particularly suitable for uses in the construction industry, especially
  for the reinforcing of built structures by means of steel lamellas or lamellas of carbon fiber-reinforced composite plastics (CRP), for constructions containing adhesive-bonded finished concrete parts, especially bridges or concrete towers, for example for wind turbines, shafts, pipelines or tunnels, or for constructions containing adhesive-bonded natural rocks, ceramic elements or parts made of fiber cement, steel, cast iron, aluminum, wood or polyester, for the anchoring of anchor bolts or steel rods in boreholes, for the fixing of, for example, banisters, railings or doorframes, for repairs such as, in particular, the filling of edges, holes or joins in concrete restoration, for the adhesive bonding of films of polyvinyl chloride (PVC), flexibilized polyolefin (Combiflex®), adhesion-modified chlorosulfonated polyethylene (Hypalon®) on concrete or steel.

Further fields of use relate to structural bonding in the construction or manufacturing industry, especially as adhesive mortar, assembly adhesive, reinforcement adhesive such as, in particular, for the bonding of lamellas of CRP or steel to concrete, brickwork or wood, as element adhesive, for example for bridge elements, sandwich element adhesive, facade element adhesive, reinforcing adhesive, bodywork adhesive or half-shell adhesive for rotor blades of wind turbines.

The adhesive is likewise suitable for the filling of cavities such as fissures, cracks or drillholes, wherein the adhesive is filled or injected into the cavity and fills it after curing, and bonds or sticks the flanks of the cavity to one another in a force-fitting manner.

The adhesive is particularly suitable for applications in which strength is to be built up rapidly at low temperatures, especially within the range from 0 to 10° C., for example in the assembly of bridges or other outdoor structures.

The adhesive is very particularly suitable for applications in which particularly high compressive strength is to be achieved, especially as adhesive mortar for the bonding of elements made of high-strength concrete to one another to form tower-like constructions.

The invention further provides for use of the epoxy resin adhesive described in a method of bonding, comprising the steps of mixing the components by a suitable method and either applying the mixed adhesive to at least one of the substrates to be bonded, joining the substrates to give an adhesive bond within the open time of the adhesive, or applying the mixed adhesive to a cavity or gap between two substrates, optionally inserting an anchor into the cavity or gap within the open time of the adhesive, followed by the curing of the adhesive.

An "anchor" refers here more particularly to a rebar, a threaded rod or a bolt. An anchor is especially adhesive-bonded or anchored in a wall, ceiling or foundation in such a way that a portion thereof is bonded in a force-fitting manner and a portion thereof protrudes and can be subjected to a construction load.

The adhesive is preferably applied and cured at ambient temperature, especially at a temperature in the range from 0 to 40° C., especially 5 to 30° C. This enables particularly simple handling of the adhesive and is especially advantageous outdoors, on construction sites and in unheated industrial halls.

The mixed adhesive is applied to at least one substrate, the following substrates being particularly suitable:

glass, glass ceramic, concrete, mortar, cement screed, anhydrite screed, magnesia screed, brick, tile, gypsum or natural rocks such as granite or marble;

metals or alloys such as aluminum, iron, steel or nonferrous metals, or surface-finished metals or alloys such as galvanized or chromed metals;

wood, woodbase materials bonded with resins, for example phenolic, melamine or epoxy resins, or further polymer composites;

polymers, especially rigid or flexible PVC, ABS, polycarbonate (PC), polyamide (PA), polyesters, PMMA, epoxy resins, PUR, POM, PO, PE, PP, EPM or EPDM, where the polymers have optionally been surface-treated by means of plasma, corona or flames;

fiber-reinforced plastics, such as carbon fiber-reinforced composite plastics (CRP), glass fiber-reinforced plastics (GRP) or sheet molding compounds (SMC);

coated substrates such as powder-coated metals or alloys;

paints or varnishes.

The substrates can be pretreated if required prior to the application of the adhesive. Pretreatments of this kind especially include physical and/or chemical cleaning methods, for example sanding, sandblasting, shotblasting, brushing and/or blowing, and also treatment with detergents or solvents, or the application of an adhesion promoter, an adhesion promoter solution or a primer.

Porous mineral substrates are preferably pretreated such that there is an open-pore, largely dust-free surface without a cement skin.

The use of the adhesive gives rise to a bonded article. This is especially a building, a bathroom, a kitchen, a stairway, a roof, a balcony, a terrace, a parking deck, a bridge, a shaft, a pipeline, a tunnel, a sandwich element of a structure constructed by lightweight construction, a solar panel such as a photovoltaic or solar thermal module, a facade, a domestic appliance, a rotor blade of a wind turbine, a concrete tower, an automobile, a bus, a truck, a rail vehicle, a ship, an aircraft, a helicopter, or an installable component thereof.

More preferably, the epoxy resin adhesive is used for production of an adhesive bond having a compressive strength of at least 120 MPa, preferably at least 125 MPa, determined to ASTM D695 on specimens cured at room temperature for 7 days at a testing speed of 1.3 mm/min as described in the examples which follow.

This adhesive bond is preferably a constituent of a concrete tower of a wind turbine.

EXAMPLES

Working examples are adduced hereinafter, which are intended to elucidate the invention described in detail. It will be appreciated that the invention is not restricted to these described working examples.

"AHEW" stands for amine hydrogen equivalent weight.

"EEW" stands for epoxy equivalent weight.

"Standard conditions" refer to a temperature of 23±1° C. and a relative air humidity of 50±5%. "SC" stands for "standard conditions".

Viscosity was measured with a thermostated Rheotec RC30 cone-plate viscometer (cone diameter 50 mm, cone angle 1°, cone tip-plate distance 0.05 mm) at a shear rate of $10\ s^{-1}$.

Commercial Substances Used:

BA-DGE: bisphenol A diglycidyl ether, EEW about 190 g/eq (Araldite® GY 250, from Huntsman).

BuD-DGE: butane-1,4-diol diglycidyl ether, EEW about 122 g/eq (Araldite® DY-D, from Huntsman).

D.E.N.® 431: epoxy novolak resin (phenol novolak glycidyl ether), EEW about 175 g/eq, functionality 2.8 (from Olin).

D.E.N.® 438: epoxy novolak resin (phenol novolak glycidyl ether), EEW about 180 g/eq, functionality 3.6 (from Olin).

Solvesso: solvent based on aromatic hydrocarbons (Solvesso® 150 ND, from ExxonMobil).

BHMT-(50-78%): technical grade quality of bis(6-amino-hexyl)amine with a purity in the range from 50% to 78% by weight, AHEW about 48 g/eq (Dytek® BHMT Amine (50-78%), from Invista)

TETA: triethylenetetramine (TETA), AHEW about 27 g/eq (technical grade, from Huntsman).

TEPA: tetraethylenepentamine (TEPA), AHEW about 30 g/eq (technical grade, from Huntsman).

PEHA: pentaethylenehexamine, AHEW about 34 g/eq (technical grade, from Delamine).

Ethylenamin E-100: mixture comprising TEPA, PEHA, HEHA and higher molecular weight components, AHEW about 37 g/eq (from Huntsman).

DMAPAPA: 3-(3-(dimethylamino)propylamino)propylamine, AHEW 53 g/eq (DMAPAPA, from Arkema).

DMAPA: 3-(N,N-dimethylamino)propylamine, AHEW 51 g/eq (DMAPA, from Huntsman).

PM-DETA: N,N,N',N'',N''-pentamethyldiethylenetriamine, (Lupragen® N 301, from BASF).

BisDMAPA: bis(3-(N,N-dimethylamino)propyl)amine, AHEW 187.3 g/eq (3,3'-iminobis(N,N-dimethylpropylamine, from Sigma Aldrich).

Acc. 2950: technical grade mixture comprising 2,4,6-tris(N,N-dimethyl-4-amino-2-azabutyl)phenol, AHEW about 75 g/eq (Accelerator 2950, from Huntsman).

K 54: 2,4,6-tris(dimethylaminomethyl)phenol (Ancamine® K 54, from Air Products)

D-230: polyoxypropylenediamine, average molecular weight about 230 g/mol, AHEW about 60 g/eq (Jeffamine® D-230, from Huntsman).

MXDA: 1,3-bis(aminomethyl)benzene, AHEW 34 g/eq (from Mitsubishi Gas Chemical).

Quartz flour: grain size 0 to 75 μm

Quartz sand: grain size 0.1 to 0.3 mm

Preparation of Adducts AD:

Adduct A1:

An initial charge of 77.5 g of BHMT-(50-78%) under a nitrogen atmosphere was heated to 80° C. While stirring, 22.5 g of D.E.N.® 438 preheated to 100° C. was added gradually, while keeping the temperature of the reaction mixture between 80 and 100° C. by cooling. The reaction mixture was then left at 80 to 100° C. for 1 hour and then cooled down to room temperature. A dark-colored liquid having a viscosity at 25° C. of 19.8 Pa·s and a theoretical AHEW of 67.1 g/eq was obtained.

Adduct A2:

An initial charge of 75.0 g of BHMT-(50-78%) under a nitrogen atmosphere was heated to 80° C. While stirring, 25.0 g of D.E.N.® 431 preheated to 60° C. was added gradually, while keeping the temperature of the reaction mixture between 80 and 100° C. by cooling. The reaction mixture was then left at 80 to 100° C. for 1 hour and then cooled down to room temperature. A dark-colored liquid having a viscosity at 25° C. of 11.7 Pa·s and a theoretical AHEW of 70.4 g/eq was obtained.

Adduct A3:

An initial charge of 70.0 g of TETA under a nitrogen atmosphere was heated to 60° C. While stirring, 30.0 g of D.E.N.® 431 preheated to 60° C. was added gradually, while keeping the temperature of the reaction mixture between 60 and 90° C. by cooling. The reaction mixture was then left at 70 to 90° C. for 1 hour and then cooled down to room temperature. A clear, yellowish liquid having a viscosity at 25° C. of 2.7 Pa·s and a theoretical AHEW of 41.3 g/eq was obtained.

Adduct A4:

An initial charge of 69.4 g of TETA under a nitrogen atmosphere was heated to 80° C. While stirring, 30.6 g of D.E.N.® 438 preheated to 100° C. was added gradually, while keeping the temperature of the reaction mixture between 80 and 100° C. by cooling. The reaction mixture was then left at 70 to 90° C. for 1 hour and then cooled down to room temperature. A clear, yellowish liquid having a viscosity at 25° C. of 6.9 Pa·s and a theoretical AHEW of 41.7 g/eq was obtained.

Adduct A5:

An initial charge of 75.0 g of TEPA under a nitrogen atmosphere was heated to 80° C. While stirring, 25.0 g of D.E.N.® 438 preheated to 100° C. was added gradually, while keeping the temperature of the reaction mixture between 80 and 100° C. by cooling. The reaction mixture was then left at 80 to 100° C. for 1 hour and then cooled down to room temperature. A clear, yellowish liquid having a viscosity at 25° C. of 9.0 Pa·s and a theoretical AHEW of 42.4 g/eq was obtained.

Adduct A6:

An initial charge of 79.0 g of PEHA under a nitrogen atmosphere was heated to 80° C. While stirring, 21.0 g of D.E.N.® 438 preheated to 100° C. was added gradually, while keeping the temperature of the reaction mixture between 80 and 100° C. by cooling. The reaction mixture was then left at 80 to 100° C. for 1 hour and then cooled down to room temperature. A clear, yellowish liquid having a viscosity at 25° C. of 16.5 Pa·s and a theoretical AHEW of 45.3 g/eq was obtained.

Adduct A7:

An initial charge of 80.5 g of Ethylenamin E-100 under a nitrogen atmosphere was heated to 80° C. While stirring, 19.5 g of D.E.N.® 438 preheated to 100° C. was added gradually, while keeping the temperature of the reaction mixture between 80 and 100° C. by cooling. The reaction mixture was then left at 80 to 100° C. for 1 hour and then cooled down to room temperature. A clear, yellowish liquid having a viscosity at 25° C. of 22.5 Pa·s and a theoretical AHEW of 48.4 g/eq was obtained.

Adduct A8:

An initial charge of 77.8 g of TETA under a nitrogen atmosphere was heated to 60° C. While stirring, 22.2 g of BA-DGE preheated to 60° C. was added gradually, while keeping the temperature of the reaction mixture between 60 and 90° C. by cooling. The reaction mixture was then left at 70 to 90° C. for 1 hour and then cooled down to room temperature. A clear, yellowish liquid having a viscosity at 25° C. of 0.4 Pa·s and a theoretical AHEW of 33.7 g/eq was obtained.

Production of Epoxy Resin Adhesives

Examples 1 to 22

For each example, a resin component (Resin comp.) was produced by mixing the ingredients of the resin component specified in tables 1 to 3 in the specified amounts (in parts by weight) by means of a centrifugal mixer (SpeedMixer™ DAC 150, FlackTek Inc.) and storing it with exclusion of moisture.

In addition, for each example, a hardener component (Hardener comp.) was prepared by mixing the adducts specified in tables 1 to 3 and the further ingredients of the hardener component in the amounts specified (in parts by weight) by means of the centrifugal mixer and storing it with exclusion of moisture. First of all, all ingredients except for the quartz flour and quartz sand were mixed, the viscosity of this mixture was determined, and then quartz flour and quartz sand were added and mixed.

For each example, the resin component and the hardener component were then processed by means of the centrifugal mixer to get a homogeneous paste and this was immediately tested as follows:

Compressive strength (2d SCC; 7d SCC) was determined by applying the mixed adhesive under standard climatic conditions in a silicone mold to cuboids of dimensions 12.7×12.7×25.4 mm and allowing it to cure under standard climatic conditions. After 2 and after 7 days, several such cuboids in each case were removed from the mold and compressed to destruction as per ASTM D695 at a testing speed of 1.3 mm/min, reading off the compressive strength value at the maximum force in each case. Further such cuboids were produced by cooling the components to 5° C. prior to the mixing, then mixing them, applying them to cuboids and curing them at 5° C. and about 70% relative air humidity. After 7 days, some of the cuboids were removed from the mold and tested as described for compressive strength (7d 5° C.), while further cuboids were additionally stored under standard climatic conditions for 7 days and only then removed from the mold and tested as described for compressive strength (7d 5° C.+7d SCC). A great deviation between the value after 7d 5° C.+7d SCC and the value after 7d SCC is a sign of curing defects under cold conditions.

Mechanical properties were determined by applying the mixed adhesive under standard climatic conditions to a silicone mold to obtain dumbbell-shaped bars having a thickness of 10 mm and a length of 150 mm with a gage length of 80 mm and a gage width of 10 mm and curing, and these were removed from the mold after a curing time of 7 days and used to determine tensile strength and elongation at break as per EN ISO 527 at a strain rate of 1 mm/min.

Lap shear strength on steel (LSS steel) was measured by producing multiple adhesive bonds, wherein the mixed adhesive was applied between two heptane-degreased steel sheets in a layer thickness of 0.5 mm with an overlapping bonding area of 10×25 mm. After a storage time of 7 days under standard climatic conditions, lap shear strength was determined to DIN EN at a strain rate of 10 mm/min.

Lap shear strength on carbon fiber composite (CRP) (LSS CRP) was measured by producing multiple adhesive bonds, wherein the mixed adhesive was applied between two heptane-degreased Sika® CarboDur® S512 lamellas in a layer thickness of 0.5 mm with an overlapping bonding area of 10×50 mm. After a storage time of 7 days under standard climatic conditions, lap shear strength was determined as described.

To measure adhesive bond strength between concrete and steel (Bond strength), multiple adhesive bonds were produced by applying a few grams of the mixed adhesive in each case to a concrete plate that has been cleaned by means of a steel brush and bonding an acetone-cleaned steel cylinder having a diameter of 20 mm above its base area, with a thickness of the adhesive bond of 2 mm. The bonds were stored under standard climatic conditions. After 7 days, they were pulled apart until fracture in accordance with DIN EN 4624 at a testing speed of 2 mm/min in order to determine the strength of the adhesive bond at the maximum force.

Tg (glass transition temperature) was determined by means of DSC on cured adhesive samples that had been stored under standard climatic conditions for 7 days with a Mettler Toledo DSC 3+700 instrument and the following measurement program: (1) −10° C. for 2 min, (2) −10 bis 200° C. at a heating rate of 10 K/min (=1st run), (3) 200 to −10° C. at a cooling rate of −50 K/min, (4) −10° C. for 2 min, (5) −10 to 180° C. at a heating rate of 10 K/min (=2nd run).

The results are reported in tables 1 to 3.

The examples labeled "(Ref.)" are comparative examples.

TABLE 1

Composition and properties of examples 1 to 8.

| Example | 1 | 2 | 3 | 4 | 5 | 6 | 7 | 8 |
|---|---|---|---|---|---|---|---|---|
| Resin comp. | | | | | | | | |
| BA-DGE | 59.9 | 59.4 | 61.2 | 58.1 | 58.4 | 60.1 | 58.1 | 59.6 |
| BuD-DGE | 11.2 | 11.2 | 11.5 | 10.9 | 10.9 | 11.3 | 10.9 | 11.2 |
| Solvesso | 3.8 | 3.7 | 3.8 | 3.6 | 3.7 | 3.7 | 3.6 | 3.7 |
| Quartz flour | 130.0 | 130.0 | 130.0 | 130.0 | 130.0 | 130.0 | 130.0 | 130.0 |
| Quartz sand | 100.0 | 100.0 | 100.0 | 100.0 | 100.0 | 100.0 | 100.0 | 100.0 |
| Hardener comp. | | | | | | | | |
| Adduct | A1 17.6 | A2 18.0 | A2 16.5 | A2 20.6 | A2 18.9 | A2 18.7 | A2 20.6 | A2 14.7 |
| DMAPAPA | 7.5 | 7.7 | — | — | — | — | — | 6.3 |
| DMAPA | — | — | 4.7 | — | — | — | — | — |
| PM-DETA | — | — | — | 4.1 | — | — | — | — |
| BisDMAPA | — | — | — | — | 4.9 | — | — | — |
| Acc. 2950 | — | — | — | — | — | 3.7 | — | — |
| K 54 | — | — | — | — | — | — | 4.1 | — |
| TETA | — | — | 2.4 | 2.7 | 3.2 | 2.5 | 2.7 | — |
| D-230 | — | — | — | — | — | — | — | 4.5 |
| Quartz flour | 20.0 | 20.0 | 20.0 | 20.0 | 20.0 | 20.0 | 20.0 | 20.0 |
| Quartz sand | 50.0 | 50.0 | 50.0 | 50.0 | 50.0 | 50.0 | 50.0 | 50.0 |
| Viscosity[1] (25° C.) [Pa · s] | 0.57 | 0.68 | n.d. | n.d. | n.d. | 3.11 | 1.88 | n.d. |

TABLE 1-continued

Composition and properties of examples 1 to 8.

| Example | 1 | 2 | 3 | 4 | 5 | 6 | 7 | 8 |
|---|---|---|---|---|---|---|---|---|
| Compressive strength | | | | | | | | |
| [MPa] (2 d SCC) | 131 | 131 | 123 | 124 | 129 | 126 | 133 | 131 |
| (7 d SCC) | 138 | 137 | 132 | 132 | 138 | 131 | 133 | 132 |
| (7 d 5° C.) | 115 | 109 | 105 | 103 | 114 | 86 | 84 | 89 |
| (7 d 5° C. + 7 d SCC) | 133 | 131 | 131 | 128 | 126 | 98 | 99 | 125 |
| Tensile str. [MPa] | 34 | 33 | 30 | 31 | 29 | 29 | 29 | 23 |
| Elongation at break | 0.2% | 0.2% | 0.2% | 0.2% | 0.2% | 0.2% | 0.2% | 0.3% |
| LSS steel [MPa] | 10.1 | 9.2 | 8.4 | 9.0 | 7.3 | 6.8 | 6.5 | 10.1 |
| LSS CRP [MPa] | 10.6 | 14.0 | 13.1 | 15.6 | 12.4 | n.d. | n.d. | n.d. |
| Bond strength [MPa] | 24.1 | 23.1 | 13.2 | 9.2 | 16.8 | n.d. | n.d. | n.d. |
| Tg 1st/2nd run [° C.] | 58/73 | 59/68 | 60/66 | 59/63 | 61/62 | 60/92 | 59/92 | n.d. |

"Tensile str." stands for "tensile strength"; "n.d." stands for "not determined".
[1] Viscosity of the hardener component without quartz flour and quartz sand

TABLE 2

Composition and properties of examples 9 to 16.

| Example | 9 | 10 | 11 | 12 | 13 | 14 | 15 | 16 |
|---|---|---|---|---|---|---|---|---|
| Resin comp. | | | | | | | | |
| BA-DGE | 64.2 | 65.0 | 64.3 | 63.9 | 63.1 | 64.2 | 63.6 | 63.0 |
| BuD-DGE | 12.1 | 12.2 | 12.1 | 12.0 | 11.8 | 12.1 | 11.9 | 11.8 |
| Solvesso | 4.0 | 4.0 | 4.0 | 4.0 | 4.0 | 4.0 | 4.0 | 3.9 |
| Quartz flour | 130.0 | 130.0 | 130.0 | 130.0 | 130.0 | 130.0 | 130.0 | 130.0 |
| Quartz sand | 100.0 | 100.0 | 100.0 | 100.0 | 100.0 | 100.0 | 100.0 | 100.0 |
| Hardener comp. | | | | | | | | |
| Adduct | A3 11.8 | A4 16.0 | A4 12.7 | A4 10.0 | A4 5.3 | A5 12.8 | A6 13.3 | A7 13.8 |
| DMAPAPA | 7.9 | 2.8 | 6.9 | 10.1 | 15.8 | 6.9 | 7.2 | 7.5 |
| Quartz flour | 20.0 | 20.0 | 20.0 | 20.0 | 20.0 | 20.0 | 20.0 | 20.0 |
| Quartz sand | 50.0 | 50.0 | 50.0 | 50.0 | 50.0 | 50.0 | 50.0 | 50.0 |
| Viscosity[1] (25° C.) [Pa · s] | 0.48 | 1.99 | 0.36 | 0.15 | 0.02 | 0.39 | 0.44 | 0.57 |
| Compressive strength | | | | | | | | |
| [MPa] (2 d SCC) | 135 | 120 | 131 | 133 | 134 | 132 | 133 | 130 |
| (7 d SCC) | 137 | 123 | 134 | 145 | 145 | 133 | 134 | 130 |
| (7 d 5° C.) | 110 | 84 | 101 | 107 | 116 | n.d. | n.d. | n.d. |
| (7 d 5° C. + 7 d SCC) | 122 | 109 | 118 | 119 | 125 | n.d. | n.d. | n.d. |
| Tensile str. [MPa] | 29 | 29 | 24 | 35 | 30 | 36 | 33 | 31 |
| Elongation at break | 0.2% | 0.2% | 0.2% | 0.2% | 0.2% | 0.2% | 0.2% | 0.2% |
| LSS steel [MPa] | 10.8 | 7.5 | 9.3 | 8.6 | 11.2 | 8.5 | 8.0 | 7.5 |
| LSS CRP [MPa] | 14.3 | n.d. | n.d. | n.d. | n.d. | n.d. | n.d. | n.d. |
| Bond strength [MPa] | 24.0 | n.d. | n.d. | n.d. | n.d. | n.d. | n.d. | n.d. |
| Tg 1st/2nd run [° C.] | 62/78 | 60/84 | 63/79 | 57/71 | 55/59 | 62/82 | 61/82 | 59/79 |

"Tensile str." stands for "tensile strength"; "n.d." stands for "not determined".
[1] Viscosity of the hardener component without quartz flour and quartz sand

TABLE 3

Composition and properties of examples 17 to 21.

| | Example | | | | |
|---|---|---|---|---|---|
| | 17 | 18 (Ref.) | 19 (Ref.) | 20 (Ref.) | 21 (Ref.) |
| Resin comp. | | | | | |
| BA-DGE | 65.1 | 61.3 | 66.0 | 60.2 | 61.4 |
| BuD-DGE | 12.2 | 11.5 | 12.4 | 11.3 | 11.5 |
| Solvesso | 4.1 | 3.8 | 4.1 | 3.8 | 3.8 |
| Quartz flour | 130.0 | 130.0 | 130.0 | 130.0 | 130.0 |
| Quartz sand | 100.0 | 100.0 | 100.0 | 100.0 | 100.0 |
| Hardener comp. | | | | | |
| Adduct | A8 12.1 | A2 19.9 | A3 15.8 | A2 18.5 | A1 18.6 |
| DMAPAPA | 5.6 | — | — | — | — |
| TETA | — | 3.5 | 1.7 | — | — |
| AEP | — | — | — | 6.2 | — |
| MXDA | — | — | — | — | 4.7 |
| Quartz flour | 20.0 | 20.0 | 20.0 | 20.0 | 20.0 |
| Quartz sand | 50.0 | 50.0 | 50.0 | 50.0 | 50.0 |
| Viscosity[1] (25° C.) [Pa · s] | 0.13 | 2.44 | 2.76 | 1.51 | 1.61 |
| Compressive strength | | | | | |
| [MPa] (2 d SCC) | 126 | 102 | 109 | 108 | 103 |
| (7 d SCC) | 133 | 113 | 114 | 114 | 111 |

TABLE 3-continued

Composition and properties of examples 17 to 21.

| | Example | | | | |
|---|---|---|---|---|---|
| | 17 | 18 (Ref.) | 19 (Ref.) | 20 (Ref.) | 21 (Ref.) |
| (7 d 5° C.) | n.d. | n.d. | n.d. | n.d. | n.d. |
| (7 d 5° C. + 7 d SCC) | n.d. | n.d. | n.d. | n.d. | n.d. |
| Tensile str. [MPa] | 30 | 31 | 21 | 26 | 21 |
| Elongation at break | 0.2% | 0.2% | 0.1% | 0.2% | 0.1% |
| LSS steel [MPa] | 9.5 | 4.9 | 4.0 | 8.5 | 6.1 |
| Tg 1st/2nd run [° C.] | 56/87 | 51/66 | 55/92 | n.d. | n.d. |

"Tensile str." stands for "tensile strength";
"n.d." stands for "not determined".
[1]Viscosity of the hardener component without quartz flour and quartz sand

The invention claimed is:

1. An epoxy resin adhesive comprising
a resin component comprising at least one epoxy resin,
a hardener component comprising
(a) at least one adduct AD obtained from the reaction of (i) at least one polyepoxide with (ii) at least one amine of the formula (I) and optionally further amines,

  (I)

where
n is an integer from 1 to 10, and
A in each case is a divalent hydrocarbyl radical having 2 to 8 carbon atoms, where all nitrogen atoms are separated from one another in each case by a chain of at least two carbon atoms, and
(b) 3-(3-(dimethylamino)propylamino)propylamine as at least one accelerator B,
wherein
the epoxy resin adhesive comprises a total of at least 50% by weight of inorganic fillers,
the epoxy resin adhesive is curable at a temperature from about 0 to 40° C., and
the epoxy resin adhesive is not an aqueous system.

2. The epoxy resin adhesive as claimed in claim 1, wherein the polyepoxide is a monocyclic or polycyclic aromatic glycidyl ether having an average functionality in the range from 2 to 4.

3. The epoxy resin adhesive as claimed in claim 2, wherein the polyepoxide is a novolak glycidyl ether having an average functionality in the range from 2.5 to 3.9.

4. The epoxy resin adhesive as claimed in claim 1, wherein the amine of the formula (I) is selected from the group consisting of triethylenetetramine, tetraethylenepentamine, pentaethylenehexamine, hexaethyleneheptamine, N,N'-bis(3-aminopropyl)ethylenediamine and bis(6-aminohexyl)amine.

5. The epoxy resin adhesive as claimed in claim 1, wherein the primary amino groups of the amine of the formula (I) and any further amines present are in a stoichiometric excess over the epoxy groups of the polyepoxide in the reaction to give the adduct.

6. The epoxy resin adhesive as claimed in claim 1, wherein the hardener component has a content of adduct AD in the range from 20% to 80% by weight based on the compounds reactive with epoxy groups that are present in the hardener component.

7. The epoxy resin adhesive as claimed in claim 1, wherein the hardener component has a content of 3-(3-(dimethylamino)propylamino)propylamine in the range from 10% to 70% by weight, based on the compounds reactive with epoxy groups that are present in the hardener component.

8. The epoxy resin adhesive as claimed in claim 1, wherein the inorganic filler present is quartz flour and/or quartz sand.

9. The epoxy resin adhesive as claimed in claim 8, wherein it comprises 50% to 90% by weight of quartz flour and/or quartz sand.

10. A cured adhesive obtained from the epoxy resin adhesive as claimed in claim 1 after the mixing of the components and curing thereof.

11. An adhesive bonding method using the epoxy resin adhesive as claimed in claim 1, comprising the steps of
mixing the resin component and the hardener by a suitable method to form a
mixed adhesive and
either
applying the mixed adhesive to at least one of the substrates to be bonded,
joining the substrates to give an adhesive bond within the open time of the adhesive,
or
applying the mixed adhesive to a cavity or gap between two substrates,
optionally inserting an anchor into the cavity or gap within the open time of the adhesive,
followed by the curing of the epoxy resin adhesive at a temperature from about 0 to 40° C.

12. The method as claimed in claim 11 wherein the method produces an adhesive bond having a compressive strength of at least 120 MPa, determined to ASTM D695 on specimens cured at room temperature for 7 days at a testing speed of 1.3 mm/min.

13. The epoxy resin adhesive as claimed in claim 1, wherein the epoxy resin adhesive contains no more than 1% by weight, of water.

14. The epoxy resin adhesive as claimed in claim 1, wherein the epoxy resin adhesive is curable at a temperature from about 5 to 30° C.

15. A process for preparing a hardener component of an epoxy resin adhesive containing a resin component comprising at least one epoxy resin, the process comprising the steps of
preparing an adduct AD by reacting at least one polyepoxide with at least one amine of formula (I) and optionally further amines, where the primary amino groups are in a stoichiometric excess over the epoxy groups, at a temperature in the range from 40 to 140° C. until all the epoxy groups have reacted,

  (I)

where
n is an integer from 1 to 10, and
A in each case is a divalent hydrocarbyl radical having 2 to 8 carbon atoms, where all nitrogen atoms are separated from one another in each case by a chain of at least two carbon atoms, and mixing the resultant adduct AD with 3-(3-(dimethylamino)propylamino)propylamine as at least one accelerator B, wherein the epoxy resin adhesive comprises a total of at least 50% by weight of inorganic fillers, the epoxy resin adhesive is curable at a temperature from about 0 to 40° C., and the epoxy resin adhesive is not an aqueous system.

\* \* \* \* \*